(12) United States Patent
Speiden

(10) Patent No.: US 8,974,145 B2
(45) Date of Patent: Mar. 10, 2015

(54) SYSTEM AND METHOD FOR TREATING GOLF SAND BUNKERS

(71) Applicant: Richard Scott Speiden, St. Charles, IL (US)

(72) Inventor: Richard Scott Speiden, St. Charles, IL (US)

(73) Assignee: Advantage Systems, LLC, New Lennox, IL (US)

( * ) Notice: Subject to any disclaimer, the term of this patent is extended or adjusted under 35 U.S.C. 154(b) by 0 days.

(21) Appl. No.: 13/958,663

(22) Filed: Aug. 5, 2013

(65) Prior Publication Data

US 2014/0037380 A1    Feb. 6, 2014

Related U.S. Application Data

(60) Provisional application No. 61/679,314, filed on Aug. 3, 2012.

(51) Int. Cl.
*C09K 17/40* (2006.01)
*E02B 11/00* (2006.01)
*A63B 57/00* (2006.01)

(52) U.S. Cl.
CPC ............ *E02B 11/00* (2013.01); *A63B 57/0068* (2013.01); *C09K 17/40* (2013.01); *A63B 2209/00* (2013.01)
USPC ................................. 405/128.5; 405/128.75

(58) Field of Classification Search
USPC ........... 405/36, 128.1, 128.15, 128.45, 128.5, 405/128.7, 128.75
See application file for complete search history.

(56) References Cited

U.S. PATENT DOCUMENTS

| | | | | |
|---|---|---|---|---|
| 3,719,050 | A * | 3/1973 | Asao et al. | 405/264 |
| 5,147,156 | A * | 9/1992 | Guettler et al. | 406/197 |
| 5,622,864 | A * | 4/1997 | Buchanan | 435/290.1 |
| 6,326,187 | B1 * | 12/2001 | Jones et al. | 435/262.5 |
| 6,467,991 | B1 | 10/2002 | Joyce et al. | |
| 6,863,477 | B2 * | 3/2005 | Jenkins et al. | 405/302.6 |
| 7,399,145 | B2 * | 7/2008 | Clark | 405/302.7 |
| 7,638,445 | B2 * | 12/2009 | Patrick | 442/190 |
| 7,699,562 | B2 * | 4/2010 | Clark | 405/129.75 |
| 8,062,143 | B1 * | 11/2011 | Meersman | 473/173 |
| 8,453,377 | B2 * | 6/2013 | Thrash et al. | 47/58.1 |
| 2006/0140725 | A1 * | 6/2006 | Benjamin et al. | 405/128.7 |
| 2007/0297858 | A1 * | 12/2007 | Imbrie | 405/128.45 |
| 2011/0229269 | A1 * | 9/2011 | Vitale et al. | 405/128.45 |

FOREIGN PATENT DOCUMENTS

EP       0990689 A2 *    4/2000

* cited by examiner

*Primary Examiner* — Benjamin Fiorello
(74) *Attorney, Agent, or Firm* — Pauley Petersen & Erickson

(57) ABSTRACT

A method and system for treating golf course sand bunkers to maintain sand in a playable condition by improving the propensity for water to pass through, opening clogged drains, and decomposing organic sediment. The method and system include a drainage solution and a microbe-based solution which are applied to the sand bunker in at least two applications, separated by a period of time, preferably a month. The drainage solution comprises a blend of surfactants and/or physical stability agents and the microbe-based solution comprises a liquid and microbes.

15 Claims, No Drawings

SYSTEM AND METHOD FOR TREATING GOLF SAND BUNKERS

CROSS REFERENCE TO RELATED APPLICATION

This application claims the benefit of U.S. Provisional Application No. 61/679,314, filed on 3 Aug. 2012. The U.S. Provisional Application No. 61/679,314 is hereby incorporated by reference herein and made a part hereof, including but not limited to those portions which specifically appear hereinafter.

BACKGROUND OF THE INVENTION

1. Field of the Invention

This invention is directed to a process and system for the treatment of golf course bunkers, also known as sand traps. Specifically, this invention is directed to a system and process to maintain sand in playable condition by improving the propensity for water to pass through, opening clogged drains, and decomposing organic sediment.

2. Discussion of Related Art

Golf is a wonderful sport that requires players to navigate obstacles throughout a course to get a golf ball in a hole in the fewest possible strokes. Virtually all golf courses are designed with and utilize bunkers, also known as sand traps, as one type of obstacle to challenge players. In addition increasing the challenge of the golf course, the bunkers aesthetically enhance the look of the course. Bunkers are preferably strategically placed to test a player's accuracy to avoid the hazard. However, if the player is unable to avoid the hazard, the sand bunker must be playable, further challenging the player's ability to hit the ball out of the sand. In order to meet an expectation of playability, the sand bunker should be relatively dry and free of debris and loose impediments. However, over time the sand bunker can become unplayable for a number of reasons, including clogged drains resulting in standing water and deterioration of the sand.

Known methods of maintaining the sand bunker are labor intensive and include raking the sand, replacing the sand, fixing drainage and pumping standing water from the trap. For example, U.S. Pat. No. 6,467,991, titled "Process and material for preventing contamination and erosion of golf course sand traps," teaches a method for treating a sand trap that requires substantially all playable sand be removed, a bottom of the trap raked, an initial amount of hydrophobic liquid polyurethane applied to the bottom of the trap, the bottom of the trap raked again, an additional amount of hydrophobic liquid polyurethane applied, a thin layer of sand applied, a further amount of hydrophobic liquid polyurethane applied, the sand raked again, a thin layer of sand sprayed with water and permitted to cure for approximately 24 hours, and finally adding a sufficient amount of sand to the trap so the trap is playable. This known process is both labor intensive and expensive.

As such, there is a need for an improved product and process for the treatment of bunkers that is less costly and less labor intensive.

SUMMARY OF THE INVENTION

A general object of the invention is to provide a system and process for treating bunkers to maintain sand in a playable condition. This invention allows water to pass easily through the sand, opens clogged drains to remove excess water, and improves decomposition of organic sediment, thereby allowing the sand in the bunker to remain clean, dry, and playable, even after a heavy rainstorm, irrigation, and/or poor drainage.

In a preferred embodiment, the system of this invention includes a drainage solution and a microbe-based solution that are preferably applied to the sand bunker in at least two applications, separated by a period of time. The period of time may range from an hour between applications to as long as months between applications. Preferably, the applications are applied with a one-month period between application of the drainage solution and the application of the microbe-based solution. Alternatively, the process of this invention may not include a period of time between treatments. In a preferred embodiment, the drainage solution is applied to the bunker first and the microbe-based solution is applied second, alternatively, the microbe-based solution may be applied first and the drainage solution applied second.

The drainage solution preferably comprises a blend of surfactants and/or physical stability agents. The drainage solution acts as an agent to open up a sand structure allowing water to more easily pass through improving drainage. In an embodiment of this invention, the drainage solution preferably comprises a liquid calcium chloride solution, a wetting agent, and a defoamer agent. The drainage solution may further include a dye, for example but not limited to a red dye.

The microbe-based solution preferably comprises a liquid including microbes that accelerate decomposition and digestion of organic materials and consumption of excess nutrients in the sand bunkers. The microbe-based solution operates to clear blocked drains by decomposing sediment blocking the drains. The microbes are preferably naturally-occurring and scientifically selected. The microbes in the microbe-based solution are also preferably strictly saprophytic and digest only non-living and dead organic materials. The microbes are preferably do not include genetically manipulated microbes. In one embodiment, the microbe-based solution includes a blend of facultative anaerobic microbial cultures selected to make the microbe-based solution effective across a wide range of substrates and/or environmental conditions. Alternatively, the microbe-based solution includes a blend of microbial cultures selected to optimally treat sand bunkers in narrow range of substrates and/or environmental conditions.

In a preferred embodiment, the process of this invention begins by removing standing water from the sand bunker with a pump or any other tool for removing water. Next, any loose debris is removed from the sand bunker. The process may then include preparing the sand for treatment with a rake or another tool. Next, the drainage solution is applied to the sand. In a preferred embodiment, the drainage solution is applied to the sand with a clean hand pump at a rate of 200 oz. of the drainage solution per 1000 sq. ft. of sand. However, the drainage solution need not be applied with the hand pump at this rate and may be applied with any tool known to one of skill in the art and at any application rate. After applying the drainage solution, water may be applied to the sand. In a preferred embodiment, the process of this invention further includes the application of the microbe-based solution to the sand bunker. The microbe-based solution is designed to speed up (in comparison to untreated bunkers) the decomposition of sediment at the bottom of the sand bunker to open up clogged drains. The microbe-based solution is preferably applied to the sand trap with a hand pump or similar tool at a rate of 86 oz. of microbe-based solution per 1000 sq. ft. of sand. Preferably, the microbe-based solution is applied to the sand bunker only after a period of time from the application of the drainage solution. The period of time is preferably one month, however, the period of time may be any other period of time, for example one hour, one day, one week or multiple months.

For best results, the process of this invention is applied to the sand bunker twice per year, however, the process can be applied more or less often, as needed.

This process improves the drainage of the sand bunker. As a result of the improved drainage, the sand bunker remains playable, with less maintenance than previously known methods.

DESCRIPTION OF PREFERRED EMBODIMENTS

The product and process of this invention rejuvenates and maintains the sand in golf course sand bunkers in a playable condition. The product and process of this invention enhances a sand bunkers capacity to allow water to pass through for drainage by opening clogged drains and decomposing organic sediment. Allowing the sand in the bunker to remain clean, dry and playable even after heavy rainstorms, irrigation issues, and/or poor drainage.

In a preferred embodiment, the process of this invention includes applying a drainage solution to the sand bunker. The drainage solution acts as an agent to open up a sand structure allowing water to more easily pass through. The drainage solution preferably comprises a blend of surfactants and/or physical stability agents. In an embodiment of this invention, the drainage solution comprises at least one of a liquid calcium chloride solution, a wetting agent to lower a surface tension of a liquid, and a defoamer agent. The liquid calcium chloride solution preferably comprises a range of 15% to 50% of the drainage solution. In an embodiment of this invention, the wetting agent preferably comprises a range of 0.01% to 2% of the drainage solution. The defoamer agent preferably comprises a range of 0.003% to 0.3% of the drainage solution. In an embodiment of this invention, the drainage solution may further include a dye, for example but not limited to a red dye, blue dye, an orange dye or a green dye. The dye comprises a range of 1% to 0.0005% of the drainage solution. The dye allows a person applying the solution to better see the drainage solution during application to make sure the drainage solution is applied to the sand and not the surrounding turf. The dye preferably should not dye the sand that is being treated.

In a preferred embodiment, the process of this invention further includes applying a microbe-based solution to the sand bunker after a period of time has elapsed from the application of the drainage solution. The microbe-based solution preferably comprises a liquid including microbes that accelerate decomposition and digestion of organic materials and consumption of excess nutrients in the sand bunkers. In an embodiment of this invention, the microbe-based solution preferably comprises water with a microbial count ranging from 5 to 12 trillion CFU (colony forming units) per gallon. The microbe-based solution most preferably comprises a microbial count of 8 trillion CFU/gallon (2 billion CFU/ml). The microbes are preferably naturally-occurring, scientifically selected. The microbes in the microbe-based solution are also preferably strictly saprophytic and digest only non-living and dead organic materials. The microbes are also preferably not genetically manipulated microbes. In an embodiment, the microbe-based solution includes a blend of facultative anaerobic microbial cultures selected to make the microbe-based solution effective across a wide range of substrates and/or environmental conditions. Alternatively, the microbe-based solution includes a blend of microbial cultures selected to optimally treat sand bunkers in narrow range of substrates and/or environmental conditions.

The process of this invention begins by removing standing water, if any, from the sand bunker with a pump. Next, loose debris, if any, is removed from the sand bunker. Next, the drainage solution is applied to the sand bunker with a clean hand held sprayer. Alternatively, the drainage solution may be applied with another method known to a person having skill in the art. In a preferred embodiment, the drainage solution is applied to the sand at a rate of 200 oz. of the drainage solution per 1000 sq. ft. of sand. However, the drainage solution need not be applied at this rate and may be applied with another application rate depending on the type of sand, the weather, the climate and/or any other reason that may change the desired application rate. Preferably, immediately after applying the drainage solution, water is applied to the sand to allow the drainage solution to permeate the sand and to minimize any chance of the drainage solution tracking out of the sand bunker due to play or maintenance. When applying the drainage solution, precautions should be taken to prevent the drainage solution from contacting turf surrounding the bunker as the drainage solution can cause serious damage to the surrounding turf. Precautions should also be taken to prevent injury to the person applying the drainage solution.

After applying the drainage solution, the applicator should wait a period of time before applying the microbe-based solution. In a preferred embodiment, the period of time comprises a month however, the period of time may be longer or shorter depending on the type of sand, the weather, the climate or any other condition. The microbe-based solution is preferably applied to the sand trap with a hand pump or similar tool at a rate of 86 oz. of microbe-based solution per 1000 sq. ft. of sand. However, the microbe-based solution need not be applied at this rate and may be applied with another application rate depending on the type of sand, the weather, the climate and/or any other reason that may change the desired application rate. The microbe-based solution is designed to speed up (in comparison to untreated bunkers) the decomposition of sediment at the bottom of the sand bunker to open up clogged drains.

For best results, the drainage solution and/or the microbe-based solution should be applied to the sand bunker twice per year. However, the condition of the sand bunker can be assess by a golf course superintendent as to the necessity of both products, the rate of application (solution/square foot of sand) and the frequency of application, and the superintendent may vary any one of these categories as necessary.

The product and process of this invention allows golf course superintendants to realize a budget savings in the maintenance of the sand bunkers by reducing the labor to restore or reconstruct washed-out, dirty sand bunkers and reduce or eliminate the process of pumping out standing water and the cost of replacing the sand. The drainage solution and the microbe-based solution and the process of this invention also allows the sand to retain its original color.

This invention has also proven effective to prevent washout from upper edges of the sand bunker. By preventing water from accumulating in the bottom of the sand trap, the sand stays in place instead of dropping off due to the additional weight of the retained water.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for treating a golf sand bunker comprising:
    applying a drainage solution to the golf sand bunker, the drainage solution comprises a liquid calcium chloride solution, a wetting agent, and a defoamer agent, wherein the liquid calcium chloride solution comprises a range of 15% to 50% of the drainage solution, the wetting agent comprises a range of 0.01% to 2% of the drainage solution, and the defoamer agent comprises a range of 0.003% to 0.3% of the drainage solution; and
    applying a microbe-based solution to the sand bunker after a period of time has elapsed from the application of the drainage solution, wherein the microbe-based solution comprises a water and microbes.

2. The method for treating the golf sand bunker of claim 1, wherein the period of time comprises one month.

3. The method for treating the golf sand bunker of claim 1, wherein the drainage solution further includes a dye and the dye comprises a range of 1% to 0.0005% of the drainage solution.

4. The method for treating the golf sand bunker of claim 1, wherein the microbe-based solution comprises a microbial count ranging from 5 to 12 trillion colony forming units per gallon.

5. The method for treating the golf sand bunker of claim 4, wherein the microbes comprise naturally-occurring, saprophytic microbes.

6. The method for treating the golf sand bunker of claim 4, wherein the microbe-based solution includes a blend of facultative anaerobic microbial cultures.

7. The method for treating the golf sand bunker of claim 1, wherein the drainage solution is applied to the golf sand bunker at a rate of 200 oz. of the drainage solution per 1000 sq. ft. of sand.

8. The method for treating the golf sand bunker of claim 1, further comprising:
    Applying water to the golf sand bunker after applying the drainage solution.

9. The method for treating the golf sand bunker of claim 1, wherein the microbe-based solution is applied to the golf sand bunker at a rate of 86 oz. of the microbe-based solution per 1000 sq. ft. of sand.

10. A method for treating a golf sand bunker comprising:
    removing standing water from the golf sand bunker;
    removing loose debris from the golf sand bunker;
    preparing a surface of the golf sand bunker with a rake;
    applying a drainage solution to the golf sand bunker, wherein the drainage solution comprises a liquid calcium chloride solution, a wetting agent, and a defoamer agent, wherein the liquid calcium chloride solution comprises a range of 15% to 95% of the drainage solution, the wetting agent comprises a range of 0.01% to 2% of the drainage solution, and the defoamer agent comprises a range of 0.003% to 0.3% of the drainage solution;
    applying water to the golf sand bunker after the drainage solution is applied; and
    applying a microbe-based solution to the golf sand bunker, wherein the microbe-based solution comprises a liquid and microbes.

11. The method of claim 10, wherein the microbe-based solution includes a blend of facultative anaerobic microbial cultures.

12. The method of claim 10, wherein the application of the drainage solution and the application of the microbe-based solution are separated by a period of time comprising at least one of a day, a week and a month.

13. The method of claim 10, wherein the drainage solution is applied at a rate of 200 oz. of the drainage solution per 1000 sq. ft. of sand and the microbe-based solution is applied at a rate of 86 oz. of the microbe-based solution per 1000 sq. ft. of sand.

14. A system for treating a golf sand bunker comprising:
    a drainage solution including a liquid calcium chloride solution, a wetting agent, and a defoamer agent, wherein the liquid calcium chloride solution comprises a range of 15% to 50% of the drainage solution, the wetting agent comprises a range of 0.01% to 2% of the drainage solution, and the defoamer agent comprises a range of 0.003% to 0.3% of the drainage solution; and
    a microbe-based solution including a liquid and microbes.

15. The system of claim 14, wherein the microbe-based solution comprises water with a microbial count ranging from 5 to 12 trillion colony forming units per gallon.

\* \* \* \* \*